United States Patent
Noraker

(10) Patent No.: US 7,213,364 B2
(45) Date of Patent: May 8, 2007

(54) FISHING TACKLE PACK

(75) Inventor: Alan G. Noraker, Aurora, CO (US)

(73) Assignee: Wright & McGill Co., Denver, CO (US)

( * ) Notice: Subject to any disclaimer, the term of this patent is extended or adjusted under 35 U.S.C. 154(b) by 0 days.

(21) Appl. No.: 10/622,919

(22) Filed: Jul. 17, 2003

(65) Prior Publication Data

US 2005/0011108 A1    Jan. 20, 2005

(51) Int. Cl.
*A01K 97/00* (2006.01)
*A01K 97/06* (2006.01)

(52) U.S. Cl. ................................ 43/54.1; 43/4.5

(58) Field of Classification Search .............. 43/54.1, 43/4.5; 224/920; 206/315.11
See application file for complete search history.

(56) References Cited

U.S. PATENT DOCUMENTS

| | | | | | |
|---|---|---|---|---|---|
| 1,201,768 | A | * | 10/1916 | Schloss | 206/303 |
| 2,999,621 | A | * | 9/1961 | Kiser | 224/199 |
| 3,062,421 | A | * | 11/1962 | Fleming | 224/199 |
| 3,537,628 | A | * | 11/1970 | Thompson | 224/609 |
| 4,026,063 | A | * | 5/1977 | Allen et al. | 43/54.1 |
| 4,759,963 | A | * | 7/1988 | Uso et al. | 428/100 |
| 4,765,037 | A | * | 8/1988 | Perry | 24/301 |
| 4,856,149 | A | * | 8/1989 | Brame | 24/3.2 |
| 4,970,821 | A | * | 11/1990 | Young | 43/54.1 |
| 5,052,555 | A | * | 10/1991 | Harmon | 206/315.11 |
| 5,337,511 | A | * | 8/1994 | Ashbaugh | 43/57.1 |
| 5,397,040 | A | * | 3/1995 | Lee | 224/679 |
| 5,489,051 | A | * | 2/1996 | Robinson | 224/148.4 |
| 5,505,354 | A | | 4/1996 | Hutton et al. | 224/196 |
| 5,950,352 | A | * | 9/1999 | Volmer | 43/54.1 |
| 6,065,659 | A | * | 5/2000 | Faz | 224/661 |
| 6,422,278 | B1 | * | 7/2002 | Grogan | 150/105 |
| 6,612,434 | B1 | * | 9/2003 | Redzisz | 206/315.11 |
| 2003/0037480 | A1 | * | 2/2003 | Davis | 43/54.1 |

* cited by examiner

*Primary Examiner*—Kurt Rowan
(74) *Attorney, Agent, or Firm*—Sheridan Ross, P.C.

(57) ABSTRACT

A fishing line compartment having one or more spools containing fishing line parts is provided. The fishing line compartment can be part of a larger container assembly or fishing tackle pack. Each spool can be held in the fishing line compartment using a strap having portions inserted through the bore of the spool. The strap is joined to the fishing line compartment using an attached end. When the attaching end of the strap is also joined to the flap, the strap is in its closed state. When in the closed state, the spool can be rotated and desired tension in the fishing line being unwound can be provided using the strap portions within the spool bore. In one embodiment, a cover overlies at least portions of the spool for use in maintaining a position of the spool in the fishing line compartment.

7 Claims, 2 Drawing Sheets

FISHING TACKLE PACK

FIELD OF THE INVENTION

The present invention relates to containing line used in fishing, particularly a pack that includes a compartment for holding one or more spools having fishing line parts used in fishing, such as tippet.

BACKGROUND OF THE INVENTION

It is typical to use different fishing line combined together when fly fishing. These parts of the fishing line are commonly identified as the backing, the main line, the leader and the tippet. When combined, the backing is attached to the fishing reel. The main line is attached to the backing. The leader is attached to the main line and the tippet is removably connected to the leader. Each of these fishing line parts differs from the other by its length and/or diameter. A fly is removably connected to the tippet.

With respect to the tippet, it is customary to replace one tippet for another, depending on fishing conditions. It is, therefore, desirable to facilitate the changing of the tippet. It is known to provide a container that is carried by the fisher and which houses a number of spools around which the tippet is wrapped. The tippet is accessible from the container by means of one or more holes. The tippet can be cut from the particular spool, even while the fisher is standing in the stream or at some other suitable location. Although such fishing containers have been advanced, it would be worthwhile to provide a housing, such as a pack, that can be readily carried by the fisher and which allows convenient access to fishing line parts, such as tippet, contained in the housing. As part of enhancing the availability of the fishing line for use by the fisher, it would be advantageous to provide effective and efficient means for holding one or more fishing line spools in such a housing or pack.

SUMMARY OF THE INVENTION

In accordance with the present invention, a fishing line compartment having a leader management system is provided, which is preferably part of a larger pack or container assembly. The fishing line compartment stores fishing line or parts thereof on one or more spools. The fishing line can include tippet that is used in fly fishing.

The fishing line compartment includes a flap having an outer area and an inner area. The flap is movable between a closed position and an open position. When the flap is in the open position, each spool therein can be accessed and/or one or more spools can be removed or added to the fishing line compartment.

The fishing line compartment includes at least a first strap having a length. The first strap holds a first spool in the fishing line compartment. The first strap can have an attached end and an attaching end. The attached end is joined to the inner area of the flap. The attaching end is inserted through the bore in the first spool. After insertion, the attaching end is also joined to the inner area. In a preferred embodiment, the attaching end is joined to the attached end, such as by a snap connection or, alternatively, the first strap can include Velcro® and the attachment can be made using the Velcro® elements.

The fishing compartment can also include one or more covers, such as a first cover that overlies at least portions of the first spool. The first cover can be useful in preventing or reducing certain movements of the spool within the fishing line compartment. The first cover can have two connection segments that are joined to the inner area of the flap. A second cover, which also has two connection segments, can be included for overlying a second spool. One of the two connection segments is adjacent to a connection segment of the first cover. The first cover preferably has a dimension that is less than the length of the first strap. Preferably also, the attached end of the first strap is located outside of the first cover.

In conjunction with providing a spool of fishing line, such as tippet, in the fishing line compartment, the strap is in an open state in which the attaching end is free and not connected to the attached end or some other part of the inner area. The attaching end is inserted through the bore in the spool while the spool is positioned outside of its respective cover. After being inserted through the bore, the attaching end can be joined to the attached end of the strap, or some other part of the inner area of the flap. The spool then has some portions of the strap located within the bore and at least portions of the spool can be then located beneath the cover. At some time during the attachment or holding of the spool within the compartment area, the fishing line part wrapped thereabout can be manipulated so that fishing line portions extend through a hole adjacent to the flap. The fisher has the fishing line part available for desired use, such as for changing tippet. Preferably, the fishing compartment is part of a fishing tackle pack or fishing line container assembly that is worn by the fisher.

Based on the foregoing summary, a number of salient features are found in, and objectives served by, the present invention. A compartment is provided for easily accessing fishing line parts. The fishing line parts can be provided on one or more spools that are readily joined within the compartment. For each spool, a strap is used to hold the spool within the compartment. When the spool rotates in connection with releasing fishing line parts and using the strap portions within the bore of the spool, desired tension on the fishing line, can be achieved. The fishing line compartment is preferably combined with other storage compartments that are part of a single pack or housing.

Additional advantages of the present invention will become readily apparent from the following discussion, particularly when taken together with accompanying drawings.

DETAILED DESCRIPTION

Figure 1:
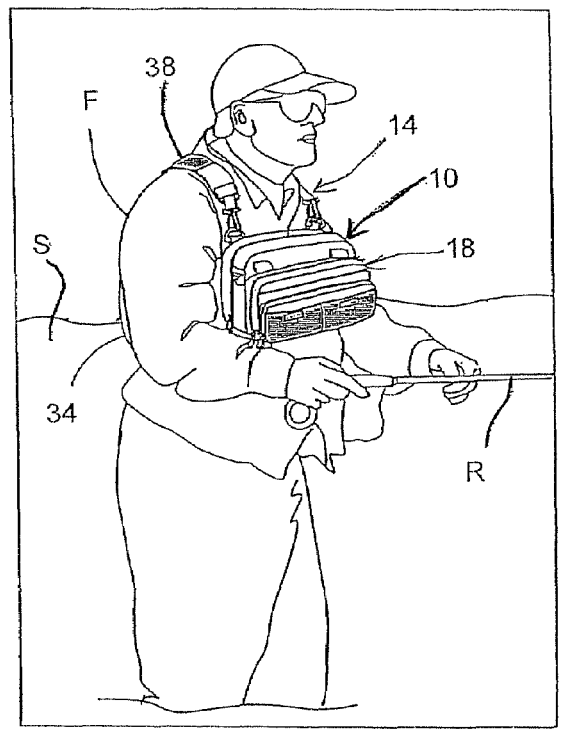
FIG. 1 is a perspective view of a fishing tackle pack that includes a fishing line compartment worn by a fisher or user.

With reference to FIG. 1, a fishing line container assembly or pack 10 is illustrated as being carried by a fisher F. The fisher F is illustrated as a fly fisherman positioned in a stream S and using a fly fishing rod R.

Figure 2:
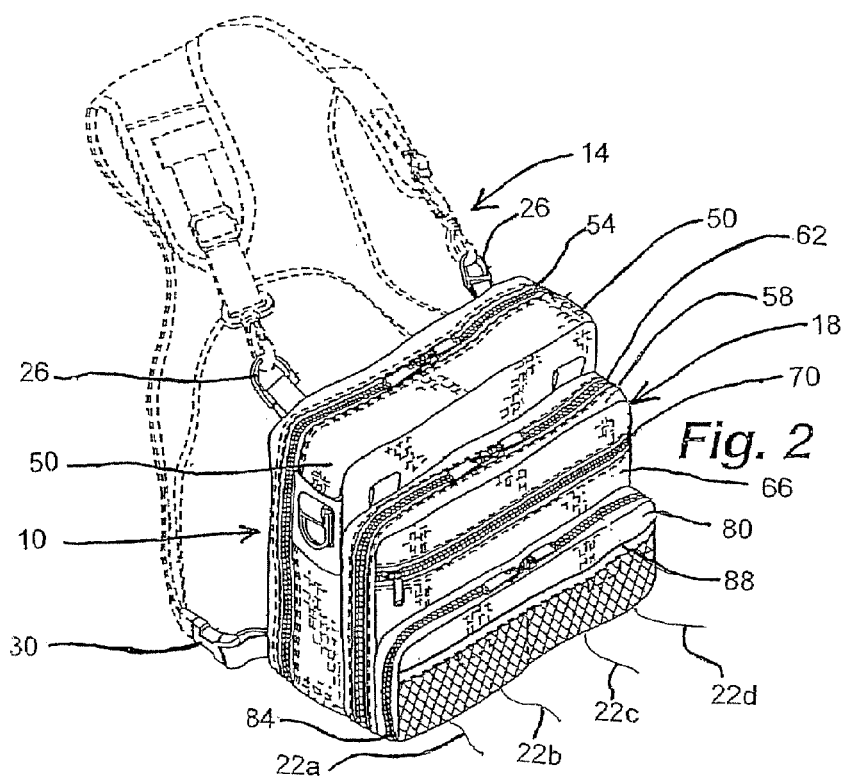
FIG. 2 is a perspective view of the pack of FIG. 1 illustrating a number of compartments, including the fishing line compartment.

With reference also to FIG. 2, the pack 10 includes a harness assembly 14 and a storage assembly 18. The harness assembly 14 is useful in supporting and positioning the storage assembly 18 in front of the fisher F. This configuration is important in enabling the fisher F to more conveniently change one or more fishing line parts at a suitable location, as will be explained in more detail later herein. As seen in FIG. 2, fishing line part 22 exits the storage assembly 18. In the illustrated embodiment, there are four fishing line parts 22a, 22b, 22c, 22d. One or more of these can be the same or different from the other fishing line parts.

The harness assembly 14 can include one or more clasps 26 that are joined to upper portions of the back of the storage assembly 18. One or more buckle mechanisms, 30 can also be provided adjacent to lower portions of the back of the storage assembly 18 in connection with joining the harness assembly 14 to the storage assembly 18. The harness assembly 14 can also have a back 34 and straps 38 for use in joining the back 34 to the storage assembly 18. As should be appreciated, a variety of supporting or holding assemblies could be used in locating the storage assembly 18 in front of the fisher F.

The storage assembly 18, as depicted in the preferred embodiment, can have a number of separate compartments for containing materials, objects, articles or other things, including fishing related items that can include fishing-related clothing. In the illustrated embodiment, there is a primary compartment 50 immediately adjacent to the harness assembly 14 which is relatively large and has a primary zipper or other closure 54. In front of it and farther away from the harness assembly 14 is a secondary compartment 58 having a secondary compartment zipper or other closure 62. Integral with the secondary compartment 58 is a pocket 66 having a pocket zipper or other closure 70. Significantly, the storage assembly 18 has a fishing line compartment 80 with a fishing line zipper or closure 84. As will next be described, the fishing line compartment 80 is the compartment from which the fishing line parts 22a–22d exit and which can be used by the fisher F in connection with adding or changing fishing line parts to the fishing line being used by the fisher F during fly fishing, for example. The storage assembly 18 can also include a netting pocket 88 joined to the outward or front face of the fishing line compartment 80.

Figure 3:
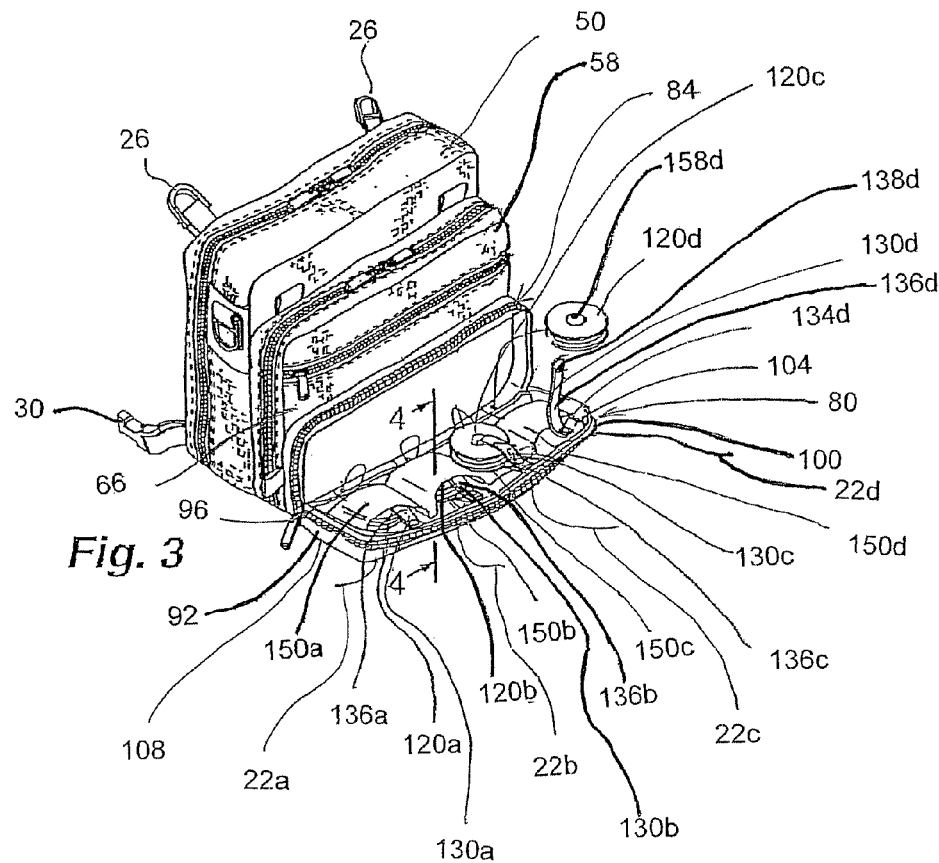
FIG. 3 is a perspective view illustrating the fishing line compartment when the flap is open, including one strap without a spool and another strap with a spool that is located outside of its respective cover.

Referring to FIG. 3, the fishing line compartment 80 that can have a leader management system is described in more detail and includes a flap 92. The flap has a hinged section or end 96 and a movable section or end 100. Disposed between the sections 96, 100 is an inner area 104 and an outer area 108. The outer area 108 of the flap 92, in one embodiment, has the netting pocket 88 attached thereto. The inner area 104 is associated with the fishing line parts 22 that can be used by the fisher F.

Specifically, the fishing line compartment 80 can contain one or more spools, such as the spools 120a, 120b, 120c, 120d to which corresponding fishing line parts 22a, 22b, 22c, 22d, respectively, are joined. Each of the fishing line parts 22a–22d is wound about a respective one of the spools 120a14 120d. One or more of the spools 120a–120d can, hold or store fishing line tippet, or other fishing line parts. Although this embodiment is directed to a fishing line compartment 80 with four spools 120a–120d, it can be appreciated that more or less spools could be provided, as well as spools that have the same or different fishing line parts. Regardless of which fishing line part is employed, each is able to exit the flap 92 through a respective access hole, such as the access hole 124 depicted in FIG. 4 through which the fishing line part 22b passes so that it can be readily accessed and used by the fisher F. By way of example, the fishing line part 22b can be tippet that is used by the fisher F in connection with changing the fishing line tippet while fly fishing. The changing of the tippet can occur at any suitable location, including while fly fishing in a stream, due to the accessible nature of the tippet and the overall configuration of the pack 10.

Figure 4:
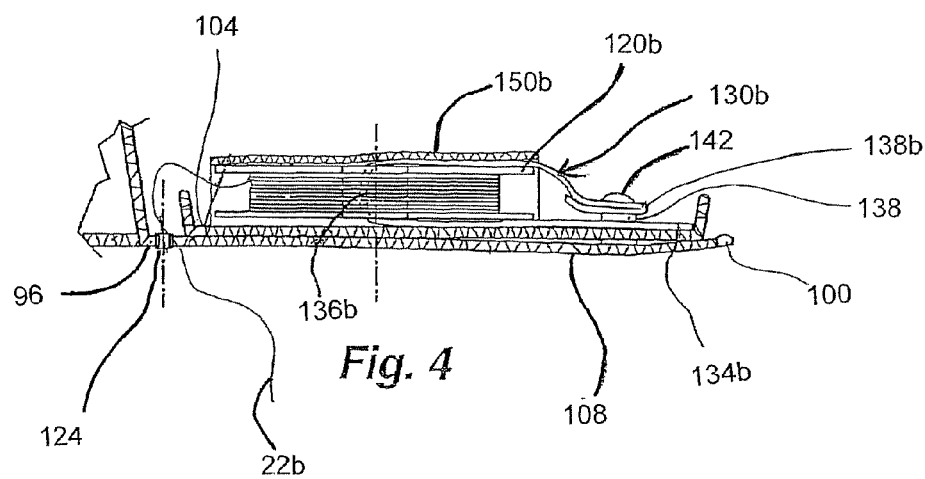
FIG. 4 is a cross-sectional view of a spool underneath a cover and being held in the fishing line compartment using a strap.

With regard to holding or maintaining each of the spools 120a–120d in the fishing line compartment 80, a number of straps are employed, with the number of straps typically corresponding to the number of spools 120a–120d so that there are four straps 130a, 130b, 130c, 130d, as identified in FIG. 3. Each of the straps 130a–130d is used to join one of the spools 120a–120d, respectively, to the inner area 104 of the flap 92. Referring to FIG. 4, portions of the strap 130b are located through the bore or opening formed in the center of the spool 120b, while end portions of the strap 130b are joined to the inner area 104. More specifically, in the illustrated embodiment, the strap 130b has an attached end 134b, a middle portion 136b and an attaching end 138b. The attached end 134b can be essentially permanently attached to the inner area 104. The attaching end 138b can be removably attached to the inner area 104 so that spools can be removed or added. In a preferred embodiment, each of the attached end 134b and the attaching end 138b are joined to the inner area 104 relatively adjacent to the movable section or end 100. In the illustrated embodiment, the attaching end 138b can be joined to the inner area 104 using the attached end 134b. Even more specifically, the attached end 134b can have a first fastening element 138 and the attaching end 138b can have a second fastening element 142 whereby the first and second fastening elements 138, 142 can be removably mated or otherwise joined together. In one embodiment, the first and second fastening elements 138, 142 can constitute a snap connection. As can be understood, although only the spool 120b and corresponding strap 130b were described in connection with being joined to the inner area 104 of the flap 92, comparable joinder is provided by the other spools and straps, including spools 120a, 120c, 120d being joined to the inner area 104 using the straps 130a, 130c, 130d, respectively. In addition, each of the other straps 130a, 130c, 130d can be understood to have a middle portion 136a, 136c, 136d. In another embodiment, instead of the straps with snap or other fastening connections, the strap could be comprised of a Velcro® material that enables removal and connection of one strap portion to another strap portion.

In a preferred embodiment, the fishing line compartment 80 also includes one or more covers, such as covers 150a, 150b, 150c, 150d. The covers 150a–150d are useful in enhancing the positioning of the spools 120a–120d, respectively, within the fishing line compartment 80 so that there is no unwanted movement. In one embodiment, each of the covers 150a–150d, has a first connection segment and a second connection segment, with the connection segments being essentially perpendicular to the longitudinal extent of the inner area 104. For covers 150b, 150c, each of their two connection segments is joined to the inner area 104 immediately adjacent to connection segments of other covers. Each of the covers 150a–150d has a lateral extent, in the direction between the hinged section 96 and the movable section 100, that is less than the distance between these two sections 96, 100. It is preferable that the connection segments of each of the covers 150a–150d be essentially fixedly joined to the inner area 104. Each of the covers 150a–150b defines openings at its ends near the hinged and movable sections 96, 100 so that the spools 120a–120d, respectively, can be received within the covers 150a–150d and, alternatively, removed therefrom.

Regarding the joining or removing of spools 120a–120d to the respective straps 130a–130d, as noted in FIG. 3, the spool 120d is schematically illustrated as not being joined to its corresponding strap 130d. This constitutes an open state of the strap 130d. This can be contrasted with the closed state of the strap 130c, which is joined to the spool 120c. When the strap is in the open state, such as the strap 130d, it has a length or lateral extent that is greater than the lateral extent of the cover 150d, with the lateral extent of the cover 150d being between the hinged and movable sections 96, 100. The attaching end 138d can be inserted through the bore 158d in the spool 120d. The attaching end 138d, after insertion through the bore 158d, can be positioned for connection to the inner area 104, such as being joined to the attached end 134d, like the joining together of the attached and attaching ends 134d, 138d of the strap 130c. The insertion of the attaching end 138d through the bore 158d is typically accomplished while the spool 120d is outside of the cover 150d. After the attached end 134d and the attaching end 138d are joined to the inner area 104, such as by being joined together, like the strap 130c, the spool can be manipulated or located underneath its cover 150d.

Referring as well to FIG. 4, the spool 120b is located within its cover 150b. In this embodiment, the width or diameter of the spool 120b is about the same or less than that of the lateral extent of the cover 150b, although in other embodiments, the width of the spool 120b could be greater than the lateral extent of the cover 150b. With the spool 120b, for example, being held to the flap 92 using its strap 130b, particularly having some portions of the strap 130b located through the bore of the spool 120b, desired tension is placed on the fishing line part when the fisher F pulls on it so that desired unwinding of the fishing line part is facilitated.

The foregoing description of the invention has been presented for purposes of illustration and discussion. Further, the description is not intended to limit the invention to the form disclosed herein. Further variations and modifications commensurate with the above teachings, within the skill and knowledge of the relevant art, are within the scope of this invention. The embodiments discussed hereinabove are also intended to explain the best modes known of practicing the invention and to enable others skilled in the art to utilize the invention in such, or in other embodiments, and with the various modifications required by the particular applications or uses of the invention. It is intended that the appended claims be construed to include alternative embodiments to the extent permitted by the prior art.

What is claimed is:

1. A method for facilitating use of fishing line by a fisher, comprising:

providing at least a first spool having a bore and fishing line;

providing a fishing tackle pack having at least a first compartment;

opening said first compartment;

inserting a strap having an attached end and an attaching end through said bore of said first spool, wherein said strap is interconnected at said fixed end to an interior surface of said at least a first compartment;

establishing a closed state of said strap and forming a loop by interconnecting said attaching end of said strap to said attached end to interconnect said first spool to said interior surface of said first compartment;

placing said first spool under a cover while said first spool is interconnected to said interior surface of said first compartment, wherein said spool is held between said cover and said interior surface of said first compartment, wherein said strap is received by a first opening between said cover and said interior surface of said first compartment, and wherein said fishing line from said first spool is lead from under said cover through a second opening between said cover and said interior surface of said first compartment;

threading said fishing line from said first spool through a hole formed through a panel of said at least a first compartment for use by the fisher; and after placing said first spool under said cover, closing said first compartment while said first spool is under said cover and while said fishing line from said spool is threaded through said hole.

2. The method of claim 1, further including creating tension on said fishing line when pulled from said first spool using at least portions of said strap within said bore.

3. The method of claim 1, wherein said inserting step includes inserting said attaching end through said bore, and wherein said establishing a closed state of said strap includes securing said attaching end to one of said attached end and an area proximate to said attached end.

4. The method of claim 1, wherein said inserting step includes inserting said strap while said bore is located outwardly of said cover.

5. The method of claim 4, wherein said locating step includes positioning at least portions of said first spool under said cover.

6. The method of claim 1, wherein in said closed state of said strap, a first surface of said strap at a first location along said strap is adjacent said first surface of said strap at a second location along said strap, wherein in said closed state said first and second locations are not within an outside diameter of said at least a first spool.

7. The method of claim 1, wherein in said closed state said strap encloses an area having a length that is less than a diameter of said first spool.

* * * * *